Patented Apr. 11, 1950

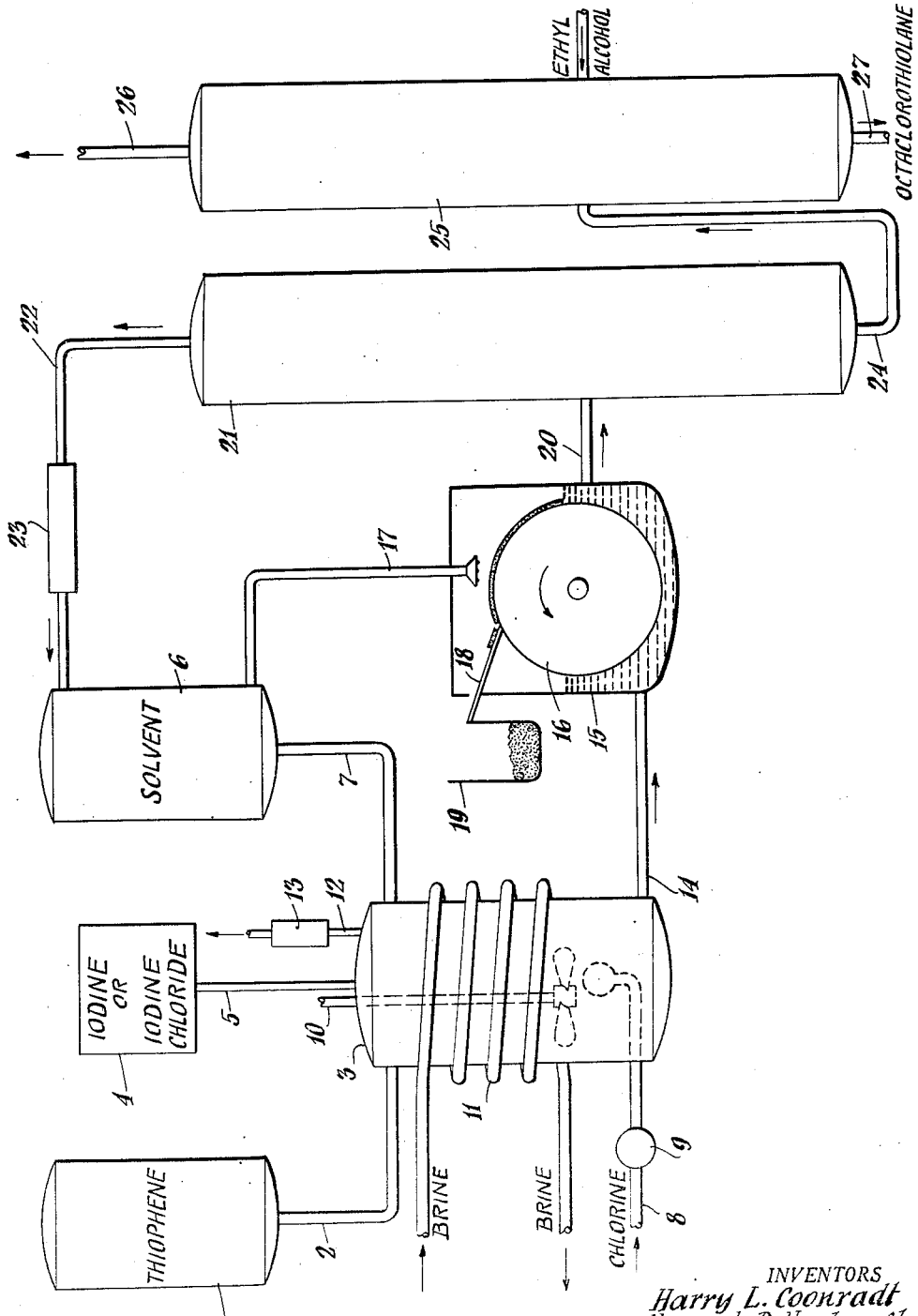

2,504,068

UNITED STATES PATENT OFFICE 2,504,068

PRODUCTION OF OCTACHLOROTHIOLANE

Harry L. Coonradt, Woodbury, and Howard D. Hartough, Pitman, N. J., assignors to Socony-Vacuum Oil Company, Incorporated, a corporation of New York Application January 25, 1949, Serial No. 72,602

20 Claims. (Cl. 260—329)

This invention relates to an improved, commercially feasible process for producing octachlorothiolane, characterized by the structural formula:

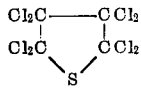

This compound has heretofore been prepared by the chlorination of monoiodothiophene in a chloroform solution. This prior procedure suffers from certain inherent disadvantages, foremost of which is the expense and time consumed in the preparation of the intermediate iodothiophene. This latter compound cannot be prepared by direct iodination of thiophene but its procedure necessitates the contacting of thiophene and iodine in the presence of mercuric oxide, the reaction proceeding in accordance with the following equation:

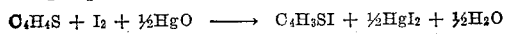

Thus, one mole of iodine and one-half mole of mercuric oxide per mole of thiophene are necessary to effect the preparation of each mole of iodothiophene. Moreover, it will be noted that one-half of the iodine is removed as mercuric iodide, from which iodine can be recovered only with difficulty and considerable expense. Furthermore, the presence of mercury compounds in the reaction product mixture necessitates extensive processing thereof to remove said compounds and to purify the iodothiophene for subsequent chlorination.

In accordance with the present invention, there has now been discovered a commercially attractive method for producing octachlorothiolane in which the aforementioned disadvantages inherent in the prior art procedure have been overcome. Broadly stated, the process of this invention comprises chlorination of thiophene with excess chlorine in the presence of at least one gram atom of iodine per mole of thiophene or in the presence of an equivalent amount of an iodine chloride, that is, at least one gram mole of iodine chloride per mole of thiophene.

It has been established that when thiophene is brought into contact with an excess of chlorine in the presence of at least one gram atom of iodine or an equivalent amount of iodine chloride per mole of thiophene, a substantial yield of octachlorothiolane is obtained. The process of this invention hence eliminates the necessity for preparing an intermediate of iodothiophene, heretofore deemed essential. This results in a marked economy in the process, since thiophene can be chlorinated directly in a single operation. The process described herein also permits essentially all of the iodine or iodine chloride used to be readily recovered at the end of the reaction by a simple filtration. The iodine or iodine chloride initially present in the reaction mixture is removed as yellow crystalline iodine trichloride, which can be further used as a source of catalyst for subsequent chlorination, either directly or by the recovery of iodine or iodine monochloride therefrom. The re-use of recovered iodine trichloride provides an economical and effective means for maintaining the desired chlorination reaction and allows the method described herein adaptable to a commercially feasible, continuous procedure of operation.

It is an essential feature of the present invention that the chlorination of thiophene be carried out in the presence of at least about one gram atom of iodine or equivalent amount of iodine chloride per mole of thiophene. When smaller amounts of iodine or iodine chloride are employed, only a small amount or no yield at all of octachlorothiolane is obtained. As the amount of iodine or iodine chloride is increased above quantities of one gram atom of iodine or one gram mole of iodine chloride per mole of thiophene, the yield of octachlorothiolane increases. It is, accordingly, a preferred embodiment of this invention to employ iodine or an equivalent quantity of iodine chloride in an amount substantially greater than one gram atom per mole of thiophene in order that improved yields of octachlorothiolane may be realized. Preferably, the amount of iodine present in the chlorination reaction mixture will be about or in excess of two gram atoms per mole of thiophene. When an iodine chloride is employed as the catalyst, the preferable amount thereof will be about or in excess of two gram moles per mole of thiophene. The upper limit as to the amount of iodine or iodine chloride employed in the present reaction appears to be confined only by economic considerations of the expense of additional amounts thereof as measured against the correspondingly increased yield of octachlorothiolane obtained. As a practical matter, the amount of iodine or equivalent amount of iodine chloride to be employed in the present process will generally not exceed about 5 gram atoms per mole of thiophene undergoing chlorination.

As indicated above, the reaction may be effected in the presence of either iodine or an iodine chloride. Iodine, itself, may be introduced into the reaction mixture in the form of vapor, solution, or solid. The chlorides of iodine include iodine monochloride and iodine trichloride, either of which may be employed to advantage in promoting the instant chlorination reaction. Thus, as the initial catalyst, iodine, iodine monochloride, or iodine trichloride may be employed. With the use of any one of these, however, iodine trichloride is obtained as a reaction by-product along with the desired octachlorothiolane. The iodine trichloride so obtained may be used as a source in providing additional quantities of iodine or iodine monochloride. It is preferred, however, to directly employ the iodine trichloride obtained in the initial reaction for use in further promoting the chlorination of thiophene to octachlorothiolane. This latter preferred embodiment of the present invention affords the basis of an attractive continuous procedure for producing octachlorothiolane. It is further to be noted that iodine monochloride or iodine trichloride may be added to the reaction mixture as such or may be prepared directly by the contact of sufficient quantities of chlorine and iodine prior to the addition of thiophene and subsequent chlorination to octachlorothiolane. The latter procedure, that is, direct preparation of the iodine chloride employed immediately prior to addition of thiophene and chlorination, has been found to generally provide higher yields of octachlorothiolane and, accordingly, represents a preferred embodiment of the present invention.

The chlorination of thiophene is, in accordance with the instant procedure, carried out with an excess of chlorine, that is, with an amount of chlorine in excess of that which will undergo reaction with the thiophene present. Generally, not more than 20 moles of chlorine per mole of thiophene will be necessary to effect the chlorination reaction of this invention. However, the use of amounts of chlorine in excess of this quantity may be employed if desired and under certain conditions may be found to be desirable. Chlorination will preferably be accomplished in the presence of a suitable inert solvent such as chloroform, carbon tetrachloride, glacial acetic acid, nitrobenzene and similar solvents commonly used in chlorination reactions.

During the chlorination, the reaction mixture is suitably cooled to a temperature below that of the room and generally the reaction is carried out at a temperature in the range of from about 0 to about 15° C. At the completion of the reaction, the yellow precipitate of iodinetrichloride is filtered off and may be further used in effecting subsequent chlorination of additional thiophene. The filtrate is then treated to remove iodine therefrom, suitably by alternate washings with an aqueous alkaline solution and an aqueous thiosulfate solution until the color of iodine disappears. The organic layer resulting from such treatment is then separated, dried and distilled to remove therefrom the particular solvent employed. The remaining material is then fractionated under reduced pressure at a temperature equivalent at atmospheric pressure (760 millimeters) to between about 210° C. and about 260° C. The residue resulting from said fractionation is octachlorothiolane. This product, upon recrystallization from ethyl alcohol, is a white, practically odorless, crystalline solid having a melting point of 221–222.5° C., a chlorine content of 78.3 per cent, and a sulfur content of 9.0 per cent.

The process of this invention is particularly adaptable for continuous operation, and a suitable apparatus for carrying out a continuous process is shown in the attached drawing, wherein thiophene is continuously chlorinated to octachlorothiolane. In the interests of simplicity and clarity, valves and pumps necessarily employed in the process have not been shown. Referring more particularly to the flow diagram, thiophene is introduced from supply tank 1 through conduit 2 to reactor 3. Iodine or iodine chloride is introduced into the reactor from supply vessel 4 through conduit 5. An inert organic solvent is introduced from its supply tank 6 through conduit 7 to the reactor. Chlorine is led into the reactor through conduit 8 and is permitted to bubble upwards through the downward counter-flowing mixture of thiophene, solvent and iodine or iodine chloride. The amount of chlorine added to the reactor is measured by a rotameter 9 inserted in line 8. The reaction mixture is agitated with stirrer 10 and cooled during chlorination by passing a cold brine or similar solution through tube coil 11 surrounding the reactor. Hydrogen chloride formed during the course of the reaction and any unreacted chlorine pass outward through vent 12, provided with condenser 13. At the completion of the chlorination, the resulting reaction product mixture consisting of a slurry of solid and liquid is conducted from the reactor through conduit 14 to a filter of the Oliver type 15, wherein solid iodine trichloride is picked up on revolving wheel 16 covered with a suitable filtering medium. The precipitate of iodine trichloride is washed with solvent passing through pipe 17. The washed precipitate is thereafter scraped from the surface of the filtering medium with scraper 18 and led to accumulator 19. The iodine trichloride collecting in accumulator 19 may then, if desired, be recycled to the reactor and further employed in promoting the chlorination of additional thiophene passing into the reactor.

The remaining liquid reaction product mixture in filter 15 is conducted through outlet 20 to fractionating tower 21. The solvent present in the liquid organic mixture is removed as overhead in fractionator 21, passing through conduit 22 and condenser 23 to solvent storage tank 6. The bottom product from fractionating tower 21 is led through conduit 24 to fractionating tower 25, where crude octachlorothiolane is obtained as a residue, while remaining lower boiling point products pass overhead through outlet 26. Octachlorothiolane is periodically removed from the bottom of tower 25 through outlet 27 by the introduction of a suitable solvent, such as ethyl alcohol, into the tower. Pure octachlorothiolane is obtained upon recrystallization from the solvent solution thereof to yield a white solid product.

The following examples will serve to illustrate the process of this invention without limiting the same:

*Example I*

Eighty-four grams (1 mole) of thiophene, 254 grams (2 gram atoms) of iodine, and 500 milliliters of chloroform were mixed together and chlorinated over a 7½-hour period with approximately 18 moles of chlorine. The temperature was maintained at about 10° C. by external cooling during the chlorination. The resultant mixture was poured into 1 liter of 10 per cent aqueous sodium carbonate solution and the suspension made alkaline by the addition thereto of more sodium carbonate. The mixture was then filtered and the organic layer of the resulting filtrate was washed successively with a 10 per cent by weight aqueous solution of sodium bisulfite, a 10 per cent by weight aqueous solution of sodium carbonate, and finally with water. The organic solution so treated was then dried over sodium sulfate and chloroform was removed therefrom by distillation. The remaining material was then fractionated under reduced pressure at a temperature of 70–75° C. at a pressure of 4 millimeters. One hundred thirty-five grams (37 per cent yield based on the weight of thiophene used) of a residue of octachlorothiolane were obtained as a result of said fractionation.

*Example II*

Eighty-four grams (1 mole) of thiophene, 254 grams (2 gram atoms) of iodine, and 500 milliliters of chloroform were mixed together and then chlorinated over a 7-hour period with approximately 17 moles of chlorine. The temperature was maintained at 5–10° C. by external cooling during the chlorination. The yellow precipitate of iodine trichloride which formed during the chlorination was removed by filtration. The precipitate was washed with four 100-milliliter portions of carbon tetrachloride and the carbon tetrachloride washings were combined with the main filtrate. The combined filtrates were then washed successively with a 10 per cent by weight aqueous solution of sodium carbonate, a 10 per cent by weight aqueous solution of sodium thiosulfate, a 10 per cent by weight aqueous sodium carbonate solution, and finally with water. The organic layer was removed from the resulting washed solution and dried over sodium sulfate. Chloroform was then distilled from the dried organic solution at atmospheric pressure. The remaining material was then fractionated under reduced pressure at a temperature of 90–103° C. and a pressure of 3 millimeters. Two hundred sixty-seven grams (76 per cent yield) of octachlorothiolane were obtained as a residue from the above fractionation.

*Example III*

Eighty-four grams (1 mole) of thiophene, 127 grams (1 gram atom) of iodine and 500 milliliters of chloroform were mixed together and then chlorinated over a 6-hour period with approximately 19 moles of chlorine. The temperature was maintained at 5–15° C. by external cooling during the chlorination. Iodine trichloride which formed during the course of the chlorination was removed at the completion of the reaction by filtration. The precipitate of iodine trichloride was washed with a small amount of chloroform and the chloroform washings were combined with the main filtrate. The combined filtrate was then made alkaline with a 10 per cent by weight sodium hydroxide solution. The organic layer of the resulting solution was separated and washed successively with a 10 per cent by weight aqueous solution of sodium hydroxide, a 10 per cent by weight aqueous solution of sodium thiosulfate, a 10 per cent by weight solution of sodium hydroxide, and finally with water, and then dried over sodium sulfate. Chloroform was distilled from the dried solution and the material remaining after said distillation was fractionated at a temperature of 105–113° C. under a reduced pressure of 5–6 millimeters. Sixty grams (17 per cent yield) of octachlorothiolane were obtained as a residue from said fractionation.

*Example IV*

Approximately one mole of iodine trichloride, obtained as a precipitate in the chlorination reaction of the preceding example, was placed in a flask and 200 milliliters of chloroform were added. The mixture was cooled to a temperature of 10° C. and 42 grams (0.5 mole) of thiophene were added slowly. The resulting mixture was allowed to stand at room temperature overnight. The mixture was then chlorinated over a period of 3 hours with approximately 7 moles of chlorine. The temperature was maintained at 5–10° C. by external cooling during the chlorination. At the completion of the reaction, the product mixture was filtered and the filtrate so obtained was made alkaline with a 10 per cent aqueous sodium hydroxide solution. The alkaline solution was then washed successively with 5 per cent by weight aqueous sodium thiosulfate, 5 per cent by weight aqueous sodium hydroxide, and finally with water. The washed organic material was then dried over sodium sulfate, and chloroform was distilled therefrom. The material remaining after said distillation was fractionated at a temperature of 77–82° C. under a reduced pressure of 1–2 millimeters. Forty-five grams (23 per cent yield) of octachlorothiolane were obtained as a residue from said fractionation.

*Example V*

Two hundred fifty-four grams (2 gram atoms) of iodine and 500 milliliters of chloroform were mixed together and chlorinated over a 1¼-hour period with approximately 3 moles of chlorine to yield a yellow precipitate of iodine trichloride. The temperature was maintained at approximately 5–10° C. by external cooling during the chlorination. The chlorination was stopped and 84 grams (1 mole) of thiophene were added over a 25-minute period while the temperature was maintained at 3–12° C. by external cooling. During the addition of thiophene, the heavy yellow precipitate of iodine trichloride disappeared and the solution became a deep red, characteristic of iodine monochloride. The chlorination was then continued over an additional 5¾-hour period, adding approximately an additional 14 moles of chlorine. The temperature was maintained at approximately 5–10° C. by external cooling during the chlorination. The precipitate which formed during the chlorination was removed by filtration. The precipitate was washed with four 100-milliliter portions of carbon tetrachloride and the carbon tetrachloride washings were combinde with the main filtrate. The combined filtrate and washings were then washed successively with a 10 per cent by weight aqueous solution of sodium carbonate, a 10 per cent by weight aqueous solution of sodium thiosulfate, a 10 per cent by weight aqueous solution of sodium carbonate, and finally with water. The organic layer was removed and dried over sodium sulfate. The chloroform and carbon tetrachloride then were distilled from the dried organic solution at atmospheric pressure. The remaining material was fractionated under reduced pressure at a temperature of 63–105° C. and a pressure of 5–6 milliliters. Two hundred ninety-three grams (81 per cent yield) of crude octachlorothiolane were obtained as a residue from the above fractionation.

*Example VI*

Two hundred fifty-four grams (2 gram atoms) of iodine and 500 milliliters of chloroform were mixed together and chlorinated over a 25-minute period with 1 mole of chlorine to yield iodine monochloride. The temperature was maintained at 5–15° C. by external cooling during the chlorination. The chlorination was stopped and 84 grams (1 mole) of thiophene were added over a 20-minute period while the temperature was maintained at approximately 10° C. by external cooling. The chlorination then was continued over an additional 6-hour and 35-minute period while an additional 16 moles of chlorine were added. The temperature was maintained at approximately 0–15° C. by external cooling during the chlorination. The precipitate which formed during the chlorination was removed by filtration. The precipitate was washed with four 100-milliliter portions of carbon tetrachloride and the carbon tetrachloride washings were combined with the main filtrate. The combined filtrate and washings were then washed successively with a 10 per cent by weight aqueous solution of sodium carbonate, a 10 per cent by weight aqueous solution of sodium thiosulfate, a 10 per cent by weight aqueous solution of sodium carbonate, and finally with water. The organic layer was removed and dried over sodium sulfate. The chloroform and carbon tetrachloride then were distilled from the dried organic solution at atmospheric pressure. The remaining material was distilled under reduced pressure until the temperature rose to 75° C. under 2 millimeters pressure. There was obtained as a residue from the above distillation 350.5 grams (96 per cent yield) of crude octachlorothiolane.

*Example VII*

Eight-four grams (1 mole) of thiophene, 25.4 grams (0.2 gram atom) of iodine and 500 milliliters of chloroform were mixed together and then chlorinated over a seven-hour period with approximately 17 moles of chlorine. The temperature was maintained at 5–10° C. by external cooling during the chlorination. The precipitate which formed during the chlorination was removed by filtration. The precipitate was washed with four 100-milliliter portions of carbon tetrachloride and the carbon tetrachloride washings were combined with the main filtrate. The combined filtrates were then washed successively with a 10 per cent by weight aqueous solution of sodium carbonate, a 10 per cent by weight aqueous solution of sodium thiosulfate, a 10 per cent by weight aqueous solution of sodium carbonate, and finally with water. The organic layer was removed from the resulting washed solution and dried over sodium sulfate. Chloroform and carbon tetrachloride were then distilled from the dried organic solution at atmospheric pressure. The remaining material was fractionated under reduced pressure at a temperature of 48–90° C. and a pressure of 2 millimeters and at 103–129° C. at a pressure of 4–6 millimeters. No octachlorothiolane could be obtained as a result of said fractionation.

From the above illustrative examples, it will be seen that the contact of thiophene with excess chlorine in the presence of an amount of iodine, iodine monochloride or iodine trichloride equivalent to at least 1 gram atom of iodine per mole of thiophene affords an effective process for producing octachlorothiolane. It will also be seen that the use of small amounts of iodine less than about 1 gram atom per mole of thiophene being treated are ineffective in promoting the chlorination of thiophene to octachlorothiolane. This fact is readily apparent from an examination of Example VII, wherein only 0.2 gram atom of iodine per mole of thiophene was employed. It will be further noted from a comparison of Examples I, II, and III, and from a comparison of Examples IV and V that as the amount of iodine or equivalent amount of iodine chloride was increased from 1 gram atom to 2 gram atoms, the yield of desired octachlorothiolane was substantially increased. As pointed out above and as shown by the procedure followed in Example IV, iodine trichloride obtained as a by-product in the chlorination process of this invention may be further employed to serve as a source of catalyst in promoting the chlorination of additional thiophene to octachlorothiolane. A comparison of Examples V and VI with Example IV indicates that direct preparation of the iodine chloride employed immediately prior to addition of thiophene and subsequent chlorination apparently provides an improved method for obtaining octachlorothiolane in excellent yield.

This application is a continuation-in-part of co-pending application Serial No. 747,314, filed May 10, 1947, now abandoned.

We claim:

1. A process for producing octachlorothiolane, which comprises contacting liquid thiophene with excess chlorine in the presence of an amount of a material selected from the group consisting of iodine, iodine monochloride, and iodine trichloride equivalent to at least 1 gram atom of iodine per mole of thiophene.

2. A process for producing octachlorothiolane, which comprises contacting liquid thiophene with excess chlorine in the presence of an amount of a material selected from the group consisting of iodine, iodine monochloride and iodine trichloride equivalent to at least 2 gram atoms of iodine per mole of thiophene.

3. A process for preparing octachlorothiolane, which comprises contacting liquid thiophene with excess chlorine in the presence of at least 1 gram atom of iodine per mole of thiophene.

4. A process for preparing octachlorothiolane, which comprises contacting liquid thiophene with excess chlorine in the presence of at least 2 gram atoms of iodine per mole of thiophene.

5. A process for preparing octachlorothiolane, which comprises contacting liquid thiophene with excess chlorine in the presence of between about 1 and about 5 gram atoms of iodine per mole of thiophene.

6. A process for preparing octachlorothiolane, which comprises contacting liquid thiophene with excess chlorine in the presence of at least 1 gram atom of iodine per mole of thiophene, filtering from the reaction mixture iodine trichloride formed therein during the course of the aforesaid reaction, washing iodine from the remaining solution and fractionally distilling the solution so treated to yield, as a residue, octachlorothiolane.

7. A process for preparing octachlorothiolane, which comprises contacting liquid thiophene with excess chlorine in the presence of at least 2 gram atoms of iodine per mole of thiophene, filtering from the reaction mixture iodine trichloride formed therein during the course of the aforesaid reaction, washing iodine from the remaining solution and fractionally distilling the solution so treated to yield, as a residue, octachlorothiolane.

8. A process for preparing octachlorothiolane, which comprises contacting liquid thiophene with excess chlorine in the presence of at least 1 gram atom of iodine per mole of thiophene at a temperature between about 0° C. and about 15° C., filtering from the reaction mixture iodine trichloride formed therein during the course of the aforesaid reaction, washing iodine from the remaining solution and fractionally distilling the solution so treated to yield, as a residue, octachlorothiolane.

9. A process for preparing octachlorothiolane, which comprises contacting liquid thiophene with excess chlorine in the presence of an inert organic solvent and at least 1 gram atom of iodine per mole of thiophene, filtering from the reaction mixture iodine trichloride formed therein during the course of the aforesaid reaction, washing iodine from the remaining solution, distilling the resulting solution to remove the organic solvent therefrom and fractionally distilling the material remaining after said distillation to yield, as a residue, octachlorothiolane.

10. A process for preparing octachlorothiolane, which comprises contacting liquid thiophene with excess chlorine in the presence of at least 1 gram mole of iodine monochloride per mole of thiophene.

11. A process for preparing octachlorothiolane, which comprises contacting liquid thiophene with excess chlorine in the presence of at least 2 gram moles of iodine monochloride per mole of thiophene.

12. A process for preparing octachlorothiolane, which comprises contacting liquid thiophene with excess chlorine in the presence of at least 1 gram mole of iodine monochloride per mole of thiophene, filtering iodine trichloride from the resulting reaction product mixture, washing iodine from the remaining solution and fractionally distilling the solution so treated to yield, as a residue, octachlorothiolane.

13. A process for preparing octachlorothiolane, which comprises contacting liquid thiophene with excess chlorine in the presence of at least 1 gram mole of iodine trichloride per mole of thiophene.

14. A process for preparing octachlorothiolane, which comprises contacting liquid thiophene with excess chlorine in the presence of at least 2 gram moles of iodine trichloride per mole of thiophene.

15. A process for preparing octachlorothiolane, which comprises contacting liquid thiophene with excess chlorine in the presence of at least 1 gram mole of iodine trichloride per mole of thiophene, filtering iodine trichloride from the resulting reaction product mixture, washing iodine from the remaining solution and fractionally distilling the solution so treated to yield, as a residue, octachlorothiolane.

16. A process for preparing octachlorothiolane, which comprises contacting liquid thiophene with excess chlorine at a temperature between about 0° C. and about 15° C. in the presence of at least 1 gram mole of iodine trichloride per mole of thiophene, filtering iodine trichloride from the resulting reaction product mixture, washing iodine from the remaining solution and fractionally distilling the solution so treated to yield, as a residue, octachlorothiolane.

17. A process for producing octachlorothiolane, which comprises reacting iodine and chlorine to form iodine monochloride, adding liquid thiophene to the reaction product of iodine monochloride, the latter compound being present in an amount of at least 1 gram mole per mole of thiophene, contacting the resulting mixture with excess chlorine, filtering iodine trichloride from the chlorinated reaction product, washing the remaining solution free of iodine and fractionally distilling the washed solution to yield a residue product of octachlorothiolane.

18. A process for producing octachlorothiolane, which comprises reacting iodine and chlorine to form iodine trichloride, adding liquid thiophene to the reaction product of iodine trichloride, the latter compound being present in an amount of at least 1 gram mole per mole of thiophene, contacting the resulting mixture with excess chlorine, filtering iodine trichloride from the chlorinated reaction product, washing the remaining solution free of iodine and fractionally distilling the washed solution to yield a residue product of octachlorothiolane.

19. A continuous process for preparing octachlorothiolane, comprising contacting liquid thiophene with excess chlorine in the presence of an inert organic solvent and an amount of a material selected from the group consisting of iodine, iodine monochloride and iodine trichloride equivalent to at least 1 gram atom of iodine per mole of thiophene, filtering the chlorinated reaction product mixture to remove solid iodine trichloride therefrom, washing the filtrate obtained from the aforesaid filtration free of iodine and distilling the washed filtrate to remove solvent therefrom, recycling the solvent so recovered to the initial reaction mixture and fractionally distilling the bottoms product from the aforesaid distillation to yield a residue product of octachlorothiolane.

20. A continuous process for preparing octachlorothiolane, comprising contacting liquid thiophene with excess chlorine in the presence of an inert organic solvent and an amount of a material selected from the group consisting of iodine, iodine monochloride, and iodine trichloride equivalent to at least 1 gram atom of iodine per mole of thiophene, filtering the chlorinated reaction product mixture to remove solid iodine trichloride therefrom, recycling the iodine trichloride so obtained to the initial reaction mixture, washing the filtrate obtained from the aforesaid filtration free of iodine, distilling the washed filtrate to remove solvent therefrom, recycling the solvent so recovered to the initial reaction mixture and fractionally distilling the bottoms product from the aforesaid distillation to yield a residue product of octachlorothiolane.

HARRY L. COONRADT.
HOWARD D. HARTOUGH.

REFERENCES CITED

The following references are of record in the file of this patent:

UNITED STATES PATENTS

| Number | Name | Date |
| --- | --- | --- |
| 2,430,667 | Cass | Nov. 11, 1947 |

OTHER REFERENCES

Willgerodt, J. pr. (2) 33, 150 (1886).
Groggins, "Unit Processes in Organic Synthesis," Ed. 3, page 234, McGraw Hill, N. Y., 1947.